United States Patent [19]
Lutz et al.

[11] Patent Number: 5,775,115
[45] Date of Patent: Jul. 7, 1998

[54] CLIMATE CONTROL DEVICE WITH A COOLING COMPRESSOR AND VISCOUS COUPLING

[75] Inventors: Dieter Lutz, Schweinfurt; Reiner Schmitt, Wartmannsroth, both of Germany

[73] Assignee: Mannesmann Sachs AG, Schweinfurt, Germany

[21] Appl. No.: 871,237

[22] Filed: Jun. 9, 1997

[30] Foreign Application Priority Data

Jun. 14, 1996 [DE] Germany ............ 196 23 676.2

[51] Int. Cl.[6] ............................................. B60H 1/32
[52] U.S. Cl. ............ 62/133; 62/323.4; 192/58.6; 192/58.7
[58] Field of Search ................ 62/133, 228.4, 62/323.1, 323.4; 192/58.4, 58.5, 58.6, 58.62, 58.63, 58.7, 58.8

[56] References Cited

U.S. PATENT DOCUMENTS

| | | | |
|---|---|---|---|
| 3,365,906 | 1/1968 | Zadig | 62/323.4 X |
| 4,488,628 | 12/1984 | Kluna et al. | 192/58 B |
| 4,579,206 | 4/1986 | Velderman et al. | 192/58.63 |
| 4,898,267 | 2/1990 | Garrett et al. | 192/21.5 |
| 5,333,679 | 8/1994 | Suzuki et al. | 62/323.4 X |
| 5,404,977 | 4/1995 | Martin et al. | 192/58.4 |
| 5,469,947 | 11/1995 | Anzai et al. | 62/133 X |
| 5,484,045 | 1/1996 | Kikuchi et al. | 192/58.4 |

FOREIGN PATENT DOCUMENTS

| | | |
|---|---|---|
| 00 66 874 | 12/1982 | European Pat. Off. . |
| 197 796 | 10/1986 | European Pat. Off. . |
| 395 007 | 10/1990 | European Pat. Off. . |
| 32 15 997 | 11/1982 | Germany . |
| 864 664 | 4/1961 | United Kingdom . |
| 1 058 832 | 2/1967 | United Kingdom . |
| WO 88 02075 | 3/1988 | WIPO . |

Primary Examiner—Harry B. Tanner
Attorney, Agent, or Firm—Cohen, Pontani, Lieberman, Pavane

[57] ABSTRACT

A climate control device for a cooling compressor operated by a driving means. The climate control device including a control device for operating the cooling compressor at a compressor speed associated with a speed of the driving means and a connection device operatively connecting the cooling compressor and the driving means. The connection device comprises a viscous coupling including a drive-side element with a work chamber and a reserve chamber in which the filling level ratios of viscous fluid in the chambers are controlled in accordance with preset values from the control device. In addition, the connection device also includes a belt disposed about the drive-side element and driven by the driving means so as to rotate the drive-side element. A driven-side element operatively connected to said drive-side element by the work chamber and in transmitting connection with an input element of the cooling compressor.

13 Claims, 4 Drawing Sheets

CLIMATE CONTROL DEVICE WITH A COOLING COMPRESSOR AND VISCOUS COUPLING

BACKGROUND OF THE INVENTION

1. Field of the Invention

The present invention is directed to a climate control device with a cooling compressor and a viscous coupling.

2. Description of Related Art

Cooling compressors may be coupled by an electromagnetic coupling to a driving means, as for example, an internal combustion engine of a motor vehicle, and uncoupled therefrom as known and described, for example, in European Patent publication 66 874 A2. The internal combustion engine is driven at a fixed transmission ratio greater than 1 so that the maximum continuous speed of the cooling compressor is greater than the speed of the driving means and may easily reach 8000 RPM.

The cooling compressor is rigidly coupled to leads of the driving means which disadvantageously results in the dependence of the cooling compressor on the driving means with respect to speed. For example, if the passenger compartment of the motor vehicle is heated after starting, the output of the cooling compressor will be relatively low, although the cooling requirement of the climate control unit is extremely high. On the other hand, during highway driving at relatively high speed the cooling compressor operates at relatively high output, but, because of the oncoming flow of cool air produced by the velocity of the motor vehicle which may be mixed in by the climate control device, the power requirement of the cooling compressor is relatively low. Consequently, in the first case the output of the cooling compressor is not sufficient, while in the latter case, the cooling compressor will demand more power from the driving means than is necessary as long as it is in operation. This problem may be remedied by operating the cooling compressor, after being switched on, for only a relatively short period of time before being switching off again. Operation of the cooling compressor is this manner is disadvantageous in that the entire mass of the cooling compressor must be accelerated to a relatively high speed every time the cooling compressor is switched on and requires the introduction of a relatively high driving torque which impedes the efficiency of the cooling compressor.

As is disclosed in German Patent publication 32 15 997 it is known that in order to improve the efficiency of high-quality cooling compressors, as for example those constructed with swash plates or wobble plates, the swash plates may be constructed so as to be adjustable in order to reduce the volume of refrigerant supplied. An adjustable swash plate is disadvantageous, however, in that it is expensive to manufacture and usually may not be reduced below a 5-percent wobble path in order to ensure the oil lubrication required for the cooling compressor without restrictions. In addition, a cooling compressor with an adjustable swash plate remains in operation even when not needed. Therefore, when operation of the cooling compressor is no longer required, the cooling compressor may only be switched off by disengaging the electromagnetic coupling.

The object of the present invention is therefore to provide an improved cooling compressor in a climate control device which may be switched on without jolting and is operated in an energy-efficient manner.

SUMMARY OF THE INVENTION

The present invention is directed to a climate control device for a cooling compressor operated by a driving means. The climate control device including a control device for operating the cooling compressor at a compressor speed associated with a speed of the driving means and a connection device operatively connecting the cooling compressor and the driving means. The connection device comprises a viscous coupling including a drive-side element with a work chamber and a reserve chamber in which the filling level ratios of viscous fluid in the chambers are controlled in accordance with preset values from the control device. In addition, the connection device also includes a belt disposed about the drive-side element and driven by the driving means so as to rotate the drive-side element. A driven-side element is operatively connected to said drive-side element by the work chamber and in transmitting connection with an input element of the cooling compressor.

In the inventive climate control device the cooling compressor is connected to the driving means, for example, an internal combustion engine of a motor vehicle, by a viscous coupling. As a result of this construction, the cooling compressor may be maintained in a predetermined speed range, preferably in the speed range between approximately 1500 RPM and 2000 RPM, independent of the respective speed of the driving means and operation of the viscous coupling is controlled such that slippage increases as the speed of the driving means increases. Even though losses may occur at the viscous coupling due to slippage, these losses may be offset by appropriate construction, as for example by returning heat to the engine. On the other hand, it is advantageous to operate the cooling compressor in an economical speed range in that a relatively small cooling compressor volume is sufficient to produce the output required to air-condition the passenger compartment of the motor vehicle. In this respect, measurements have shown that even if the power loss due to slippage at the viscous coupling is not used in some other way, the cooling compressor is nevertheless more efficient and requires a substantially reduced compressor volume than larger conventional cooling compressors of comparable capacity because of its operation in the ideal speed range. In addition, the cooling compressor, when switched on, may be accelerated from zero speed to its maximum speed by appropriate control of the viscous coupling. Thus, in a preferred embodiment of the viscous coupling, the work chamber is substantially empty when started, for example, by an adjusting device for controlling the pressure in the reserve chamber and work chamber, and is subsequently filled, more or less quickly, with viscous fluid depending upon the desired acceleration of the moving elements of the cooling compressor, the viscous fluid being removed from the reserve chamber and delivered to the work chamber by appropriate setting of the adjusting device. During acceleration, the torque needed to accelerate the moving parts of the cooling compressor are relatively small thereby improving the overall efficiency of the cooling compressor.

If a motor vehicle is parked in harsh sunlight for a relatively long period of time, relatively rapid cooling of the passenger compartment is desirable. In this case, the viscous coupling may be controlled so that it operates substantially without slippage and transmits the speed of the driving means directly to the moving parts of the cooling compressor up to a selected speed limit. The cooling compressor may, accordingly, be accelerated to a maximum speed beyond or above its preferred speed range, for example, approximately 5000 RPM. Then the cooling compressor is maintained at the maximum speed for a predetermined period of time before the viscous coupling is returned to the preferred speed range, where it again operates with slippage by means of appropriate control and accordingly by throttling the volume flow of viscous fluid from the reserve chamber to the work chamber accompanied by a simultaneous pumping of viscous fluid in the opposite direction.

In contrast, as long as there is a modest cooling requirement in the passenger compartment of the motor vehicle at idling speed, which in modern vehicles is generally between approximately 600 RPM and 800 RPM, the moving parts of the cooling compressor may be maintained within the preferred speed range in that movements of the driving means are multiplied before being transmitted to the viscous coupling such that the viscous coupling is driven at twice or more than twice the speed of the driving means. This, however, is not critical because the moving parts of the cooling compressor are prevented from exceeding the preferred speed range at higher speeds of the driving means by operating the viscous coupling with slippage.

Therefore, the delivery number, that is, the ratio of cooling output to mechanical output, may be increased from the usual factor of approximately 1.7 to a maximum of approximately 2 to 2.3 to 3 while simultaneously simplifying the overall construction of the cooling compressor insofar as it is designed as a swash plate cooling compressor thereby eliminating the need for an adjustable swash plate.

In addition, the housing of the viscous coupling, provides a drive-side element and receives a belt so as to provide a pulley. The housing of the viscous coupling has defined therein a reserve chamber and a work chamber. The drive-side element is connected to the driving means and arranged so as to be freely rotatable on a collar of the cooling compressor concentric to the shaft of the cooling compressor, while the driven-side element is connected to the shaft so as to be fixed with respect to rotation relative to the shaft. Thus, in accordance with this construction, the drive-side element and driven-side element operate with slippage.

As a result of the arrangement of the reserve chamber radially outside of the work chamber in this viscous coupling viscous fluid in the work chamber flows into the reserve chamber during rotation of the housing of the viscous coupling by centrifugal force, so that in some situations there is no need to implement the adjusting device during operation. This results in the advantage that only the speed of the housing, and not the relative speed between the housing and the element on the driven side, for example, a rotor, is decisive for the volume flow from the work chamber into the reserve chamber. The work chamber is connected to the reserve chamber, for example, in the form of a communicating tube, such that an equilibrium is established between the proportion of viscous fluid in the work chamber and the proportion of viscous fluid in the reserve chamber.

This construction simplifies control of the adjusting device. For example, in response to a decrease demand for slippage, only the pressure generated by the adjusting device in the reserve chamber is increased; the magnitude of this increase being such that the volume flowing from the work chamber into the reserve chamber as a function of speed is halted and the additional quantity of viscous fluid needed to achieve the required filling level in the work chamber is forced into the work chamber. Thus, the work chamber may be filled substantially without delay thereby increasing the speed of the moving parts of the cooling compressor. On the other hand, if it is necessary to reduce the speed of these parts, the pressure provided by the adjusting device is reduced until no new viscous fluid is supplied to the work chamber, but viscous fluid is delivered to the reserve chamber from the work chamber simultaneously as a result of centrifugal force. Since the cooling compressor is generally operated at a relatively high speed prior to reducing the pressure, the effect of the centrifugal force by means of which viscous fluid is conveyed from the work chamber into the reserve chamber is relatively high which produces a change in pressure that is also converted relatively quickly into a change in speed at the moving parts of the cooling compressor.

The viscous coupling according to the invention thus enables relatively quick and continuous conversion of control processes via the adjusting device into a change in cooling compressor output. This process may be accelerated by appropriately connecting the adjusting device to the chambers, for example, by connecting a first pressure source of the adjusting device to the work chamber and a second pressure source to the reserve chamber. In order to increase the filling level of the work chamber, for example, the pressure is increased in the reserve chamber, whereas an increase in pressure is generated in the work chamber in order to reduce the level of fluid therein. Depending on the pressure increase in one of the two chambers, it may be useful to reduce the time required for the viscous fluid to flow into and out of the other respective chamber by generating a vacuum.

In addition, to ensure that the work chamber is substantially emptied the adjusting device is controlled in a corresponding manner to shut off the viscous coupling. As a result, the speed of the moving parts of the cooling compressor may be decreased continuously to zero with optional retardation. Furthermore, during a subsequent start the moving parts of the cooling compressor may be accelerated at a relatively high acceleration power by controlling, e.g., more or less faster, the filling of the work chamber with fluid from the reserve chamber using the adjusting device.

The reserve chamber is arranged at a distance radially outside of the work chamber and the adjusting device includes a pressure source which is preferably connected to the radial region of the rotational axis of the viscous coupling which, in turn, is connected to the reserve chamber by a feed line. The feed line extends over a relatively large radial length due to the arrangement of the reserve chamber radially outside of the work chamber and as a result the range within which the surface of the viscous fluid may shift in the radial direction due to a change in pressure at the pressure source is considerable. Thus, a relatively large range of control is provided over which the pressure generated by the pressure source may be increased or decreased. The magnitude of pressure change at the pressure source produces correspondingly relatively high speeds at which the work chamber is filled and emptied. The control inertia of the viscous coupling may be reduced even further by this step, if desired.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 4:
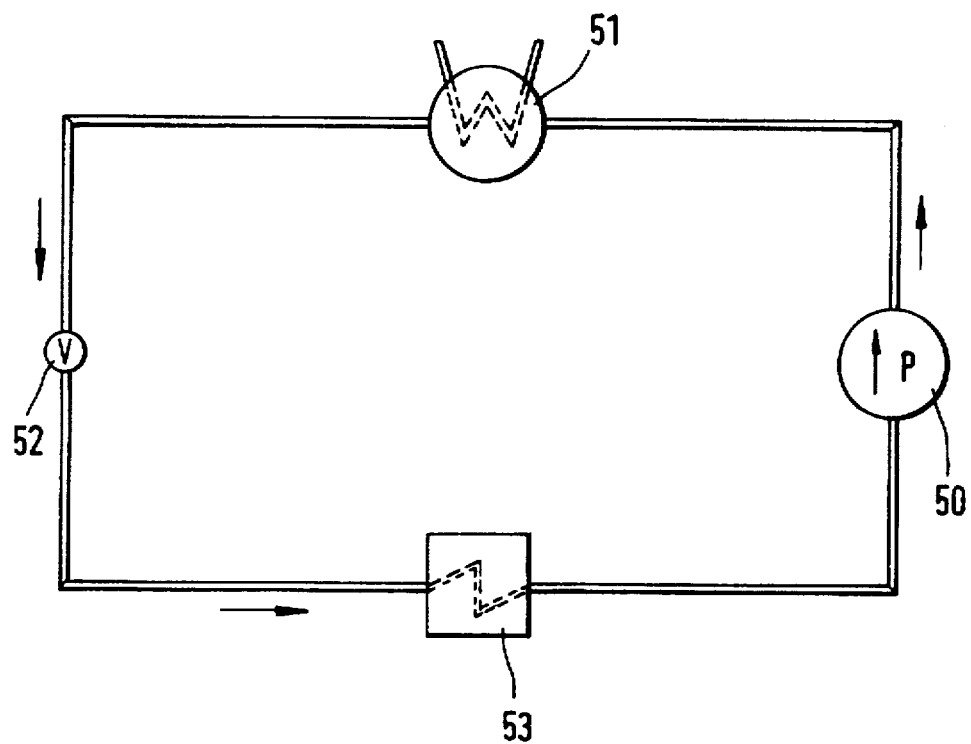
FIG. 4 shows a schematic circuit for a climate control unit.

FIG. 4 is a schematic circuit for a climate control device comprising a cooling compressor 50 for compressing and supplying refrigerant gas to a condenser 51 which includes a cooling device for condensing the refrigerant gas compressed by the cooling compressor. An expansion valve 52, for example, a nozzle, expands the refrigerant, now in liquid form, which is subsequently evaporated by an evaporator 53 whereby the refrigerant returns to the gas state. Arranged at the evaporator is the interface at which the climate control device provides a cooling effect, for example, to the passenger compartment of a vehicle.

Figure 1:
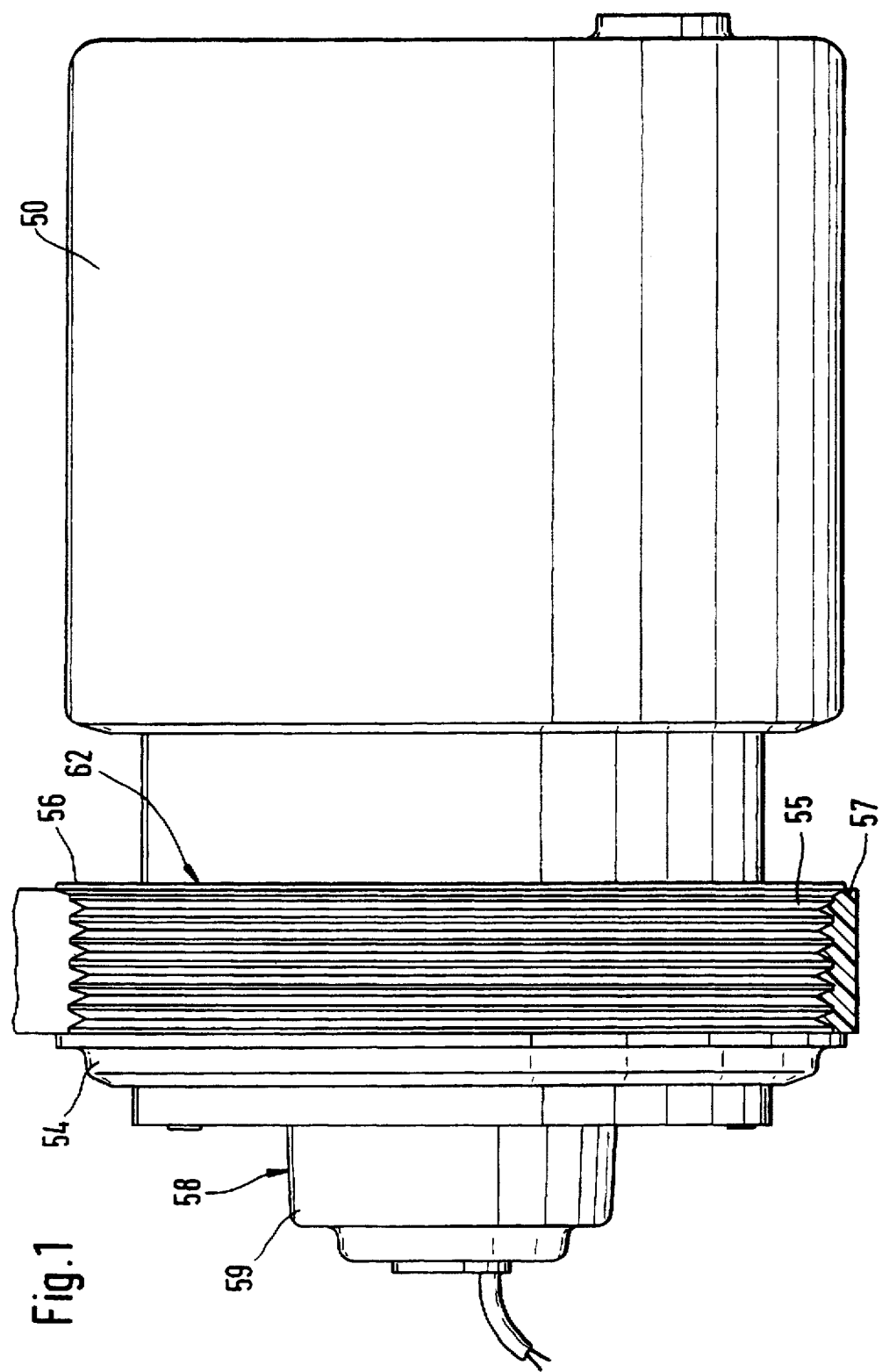
FIG. 1 shows a viscous coupling with a circumferential region serving as a pulley in accordance with the present invention.
Figure 2:
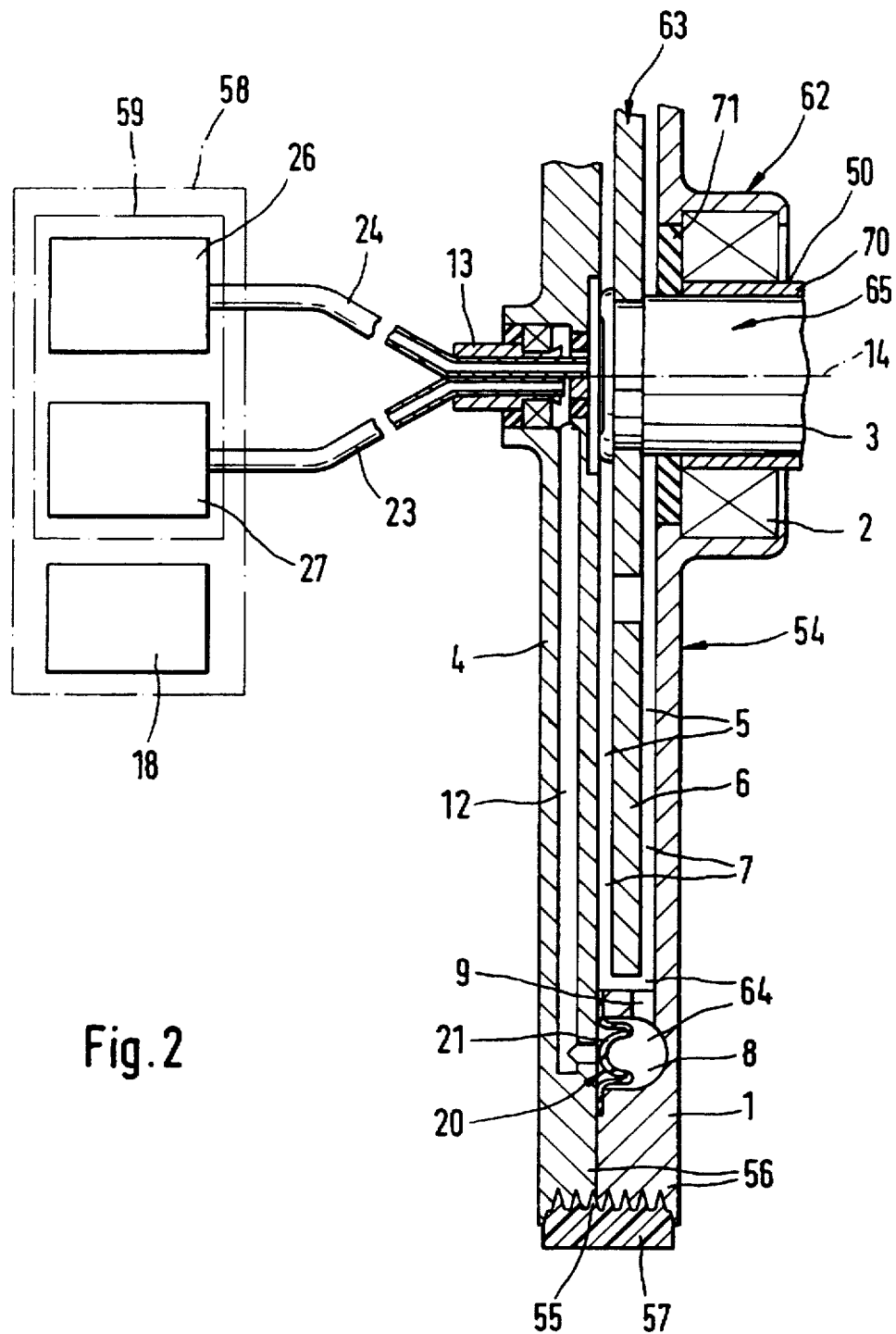
FIG. 2 shows a cross-sectional view of the viscous coupling arranged on a shaft of the cooling compressor.

Referring to FIGS. 1 and 2, cooling compressor 50 may be fastened or attached, for example, in the engine compartment of a motor vehicle, and receives a viscous coupling 54 by a shaft 3 serving as input element 65. A housing 1 of the viscous coupling 54 serves as a drive-side element 62 and is provided with grooves 55 along its radial circumference so as to form a pulley 56. Pulley 56 is connected by a belt 57 to a driving means, not shown, for example, an internal combustion engine of a motor vehicle. A control device 58 is arranged on the side of the viscous coupling 54 away or remote from the cooling compressor 50. The control device 58 comprises an adjusting device 59 with pressure sources 26 and 27 connected to the viscous coupling 54.

In FIG. 2, viscous coupling 54 is arranged by its housing 1 on a collar 70 of the cooling compressor so as to be concentric to the shaft 3 of the cooling compressor 50. Interposed between the collar 70 and housing 1 is a bearing 2 provided with a seal 71, for example, a gasket or washer. Cooling compressor 50 may be any type of known cooling compressor, for example, a swash plate compressor or a rotary compressor.

Viscous coupling 54 has a front wall 4, which together with the housing 1, encloses a recess 64 that receives a rotor 6 provided as a driven-side element 63 and attached to the shaft 3, whereby a gap defined along both sides of the rotor 6 between the rotor and the housing wall associated therewith produces a shear gap 5 when filled with viscous fluid. The recess 64 defines a work chamber 7 of the viscous coupling 54 wherein rotation introduced by the housing 1 is transmitted to the shaft 3 by the rotor 6 with the amount of slippage adjusted based on the filling level of viscous fluid in the work chamber 7.

At least one passageway or channel 9 is arranged radially outside of the work chamber 7 and extends, preferably substantially radially, between a reserve chamber 8 and a region of the outer circumference of the work chamber 7. Reserve chamber 8 is connected by at least one radially extending feed line 12 to a connector 13 disposed approximately at the center axis of rotation of the viscous coupling 54. A first pressure source 27 of an adjusting device 59 is connected to the reserve chamber 8 by a pressure line 23 and feed line 12 and a second pressure source 26 is connected to the work chamber 7 in the region of the connector 13 by a pressure line 24. The reduction of the pressure in pressure line 23 may be accelerated or increased, for example, by increasing the pressure in the pressure line 24, in that reducing the pressure in pressure line 23 increases the filling level of viscous fluid in reserve chamber 8, while increasing the pressure in pressure line 24 increases the flow of viscous fluid out from work chamber 7 into reserve chamber 8 due to centrifugal force. In addition, the direction of flow of the viscous fluid may be reversed by appropriate control of the pressure sources 26, 27 relative to one another in that, by creating a slight vacuum (reducing the pressure) in the work chamber 7 the viscous fluid flows radially inward into the work chamber 7 and increasing the pressure in pressure line 23 reduces the filing level of viscous fluid in the reserve chamber 8 thereby assisting the flow by forcing the viscous fluid out from reserve chamber 8 and into work chamber 7.

Figure 3:
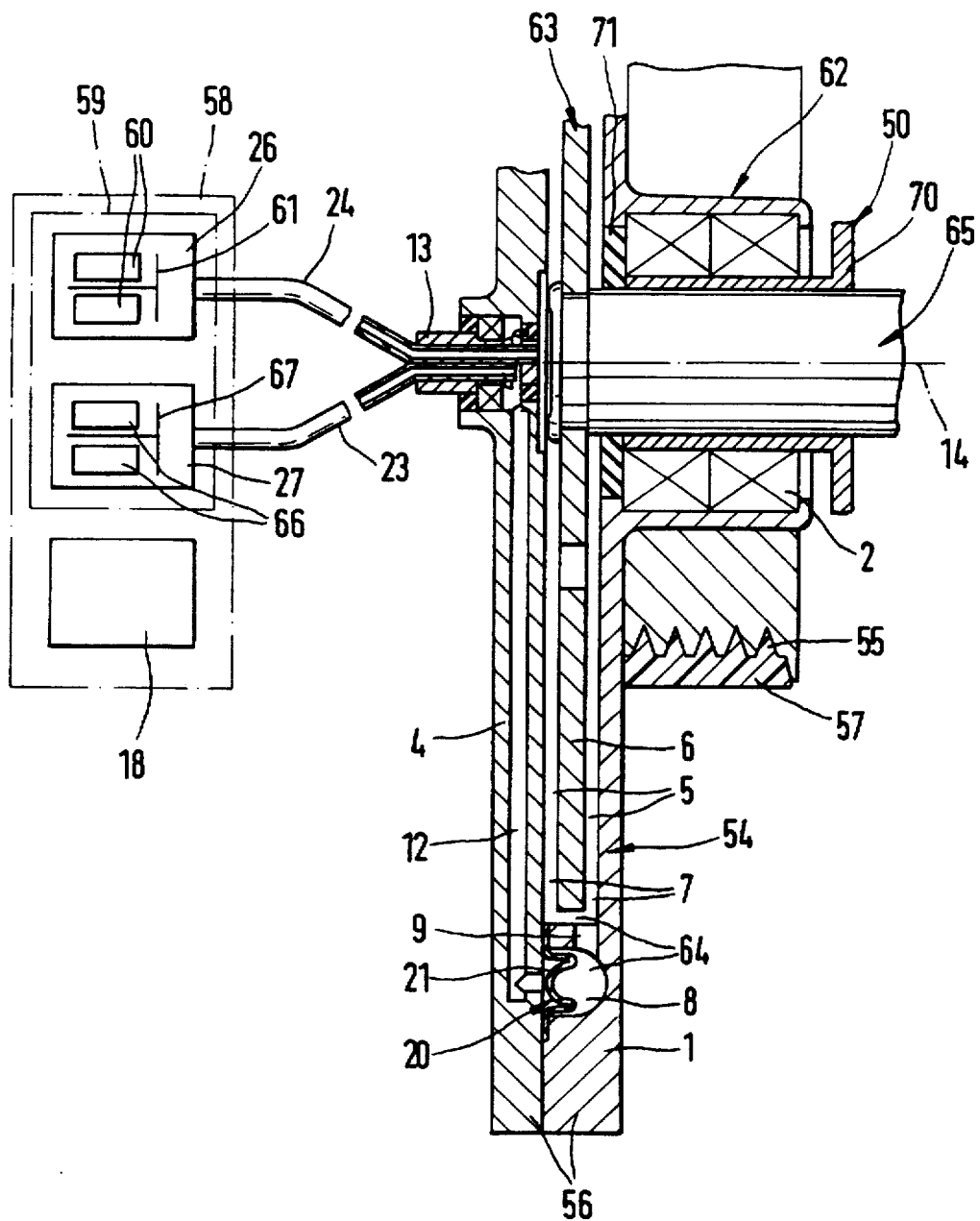
FIG. 3 shows a cross-sectional view of the viscous coupling with the pulley arranged axially between the housing of the viscous coupling and the cooling compressor.

In an alternative embodiment shown in FIG. 3, pressure sources 26 and 27 of adjusting device 59 are provided with an electromagnet 60, 66, respectively, and a piston 61, 67 which is axially displaced in order to vary the pressure ratios in the pressure lines 23, 24.

Operation of the viscous coupling will now be explained. While cooling compressor 50 is out of operation, adjusting device 59 operates in such a manner as to maintain the work chamber 7 under pressure, proceeding from the radial inner region, by the pressure source 26 and line 24, and substantially all of the viscous fluid in the work chamber 7, except for a negligible remainder, is stored in the reserve chamber 8 by channel 9. As a result, rotation of the housing 1 when driven by belt 57 is not transmitted to rotor 6 because a sufficient amount of viscous fluid in the shear gap 5 required for transmission is not available in work chamber 7.

To switch on cooling compressor 50, adjusting device 59 is controlled by the control device 58 such that the pressure is increased in pressure line 23 and accordingly, by feed line 12, to reserve chamber 8 using pressure source 27. As a result, a portion of the viscous fluid stored in the reserve chamber 8 is forced into work chamber 7 through channel or passageway 9 thereby filling the shear gap 5 at least in its outer radial region whereby the rotor 6 is driven with slippage when housing 1 rotates. The greater the pressure applied to pressure line 23 by pressure source 27, the less slippage produced because of the rising filling level of viscous fluid in the work chamber 7 and the greater proportion of movement which may be transmitted from the housing 1 to the rotor 6. If maximum pressure is applied to the reserve chamber 8 by pressure source 27 and minimum pressure is applied to work chamber 7 by pressure source 26, a final state is reached wherein movement of the drive is transmitted to the shaft 3 of the cooling compressor 50 virtually without slippage. This final state occurs, for example, after starting a motor vehicle which has been parked in the sunlight for a relatively long period of time while the drive is idling and is running within a speed range of between approximately 600 RPM and 800 RPM. The selected transmission ratio between the drive and the housing 1 of the viscous coupling 54 is preferably 1:2 or greater so that the housing 1 of the viscous coupling 54 and, accordingly, the shaft 3 of the cooling compressor 50 rotates at least approximately 1500 RPM. During subsequent acceleration, pressure sources 26, 27 of adjusting device 59 remain substantially unchanged until the drive reaches a speed at which the housing 1 of the viscous coupling 54 rotates at approximately 2000 RPM. Upon reaching the upper limit of the preferred speed range for the cooling compressor 50, any additional increase in speed at the drive is prevented from being transmitted to the shaft 3 of the cooling compressor 50 by increasing the slippage between the housing 1 and the rotor 6 of the viscous coupling 54.

However, if the shaft 3 of the cooling compressor 50 is to be operated temporarily at higher speeds, for example, up to approximately 5000 RPM, in favor of a very rapid cooling effect, slippage at the viscous coupling 54 is initiated only when the drive is moved at approximately 2500 RPM. Slippage is produced by reducing the pressure generated in pressure source 27 using the control device so that the viscous fluid is conveyed by centrifugal force from the work chamber 7 into the reserve chamber 8 arranged radially outside of work chamber 7. The flow of fluid may be accelerated by increasing the pressure generated by pressure source 26 such that the viscous fluid located in the work chamber 7 is forced radially outward into the reserve chamber 8. Consequently, the pressure in work chamber 7 and reserve chamber 8 may be controlled in an appropriate manner to achieve any desired filing level in the work chamber 7 and, accordingly, any desired slippage in order to maintain operation of the cooling compressor within a preferred speed range of approximately 1500 RPM to 2000 RPM over a relatively long period of time independent of the respective speed of the drive. To turn off the cooling compressor 50, the pressure generated by pressure sources 26 and 27 is adjusted so that substantially all of the viscous fluid is forced out from work chamber 7 into reserve chamber 8 whereby the viscous coupling 54 is no longer capable of transmitting movement from the drive to the shaft 3 of the cooling compressor 50.

In a preferred embodiment, control device 58 adjusts the pressure based on the evaluation of signals from a sensing arrangement 18, shown in FIGS. 2 and 3, which determines the respective speed of the drive, the cooling requirements and accordingly the desired output of the cooling compressor.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A climate control device for a cooling compressor operated by a driving means comprising:
   a control device for operating the cooling compressor at a compressor speed associated with a speed of the driving means;
   a connection device operatively connecting the cooling compressor and the driving means, said connection device comprising:
      a viscous coupling including a drive-side element having defined therein a work chamber and a reserve chamber for storing a viscous fluid, wherein filling level ratios of the work and reserve chambers are controlled in accordance with preset values from the control device;
      a belt driven by the driving means so as to rotate the drive-side element;
      a driven-side element operatively connected to said drive-side element by the work chamber and in transmitting connection with an input element of the cooling compressor.

2. The climate control device in accordance with claim 1, wherein the drive-side element of said viscous coupling has grooves circumferentially defined therein so as to form a pulley.

3. The climate control device in accordance with claim 2, wherein said driven-side element is disposed so as to be enclosed by the work and reserve chambers.

4. The climate control device in accordance with claim 1, wherein the input element of the cooling compressor comprises a shaft, the drive-side element being disposed to as to be freely-rotatable relative to the shaft and said driven-side element being rigidly connected with respect to rotation relative to the shaft.

5. The climate control device in accordance with claim 1, wherein said control device further comprises an adjusting member for adjusting volume flow of viscous fluid from the reserve chamber to the work chamber.

6. The climate control device in accordance with claim 5, wherein the adjusting member comprises a pressure source.

7. The climate control device in accordance with claim 6, wherein the adjusting member further comprises a piston pump.

8. The climate control device in accordance with claim 1, wherein said driven-side element is disposed in the work chamber separated by a distance from the drive-side element so as to define a gap which acts as a shear gap when filled with fluid for transmitting torque.

9. The climate control device in accordance with claim 8, wherein said drive-side element has a channel defined therein extending between the chambers for supplying the viscous fluid, and each chamber is connected to an adjusting device which generates a pressure difference to vary the filling level of the work chamber based on the control device.

10. The climate control device in accordance with claim 9, wherein the reserve chamber is disposed radially outside of the work chamber to ensure return flow of viscous fluid from the work chamber so that adjustment of the filing level of the chambers based on magnitude and acting direction of pressure generated by the adjusting device is accelerated due to centrifugal forces acting on the viscous fluid.

11. The climate control device in accordance with claim 9, wherein said viscous coupling further comprises a connector disposed outside of the drive-side element and in a radial region of a rotational axis of the drive-side element, the connector being connected to the reserve chamber by a radially extending feed line.

12. The climate control device in accordance with claim 9, wherein the adjusting device further comprises a first pressure source connected to the work chamber and a second pressure source connected to the reserve chamber.

13. The climate control device in accordance with claim 1, wherein the driving means comprises an internal combustion engine.

* * * * *